No. 728,023. PATENTED MAY 12, 1903.
J. SCHUREK & F. B. GIESLER.
METHOD OF ELECTRIC WELDING.
APPLICATION FILED MAR. 31, 1900. RENEWED SEPT. 19, 1902.
NO MODEL.
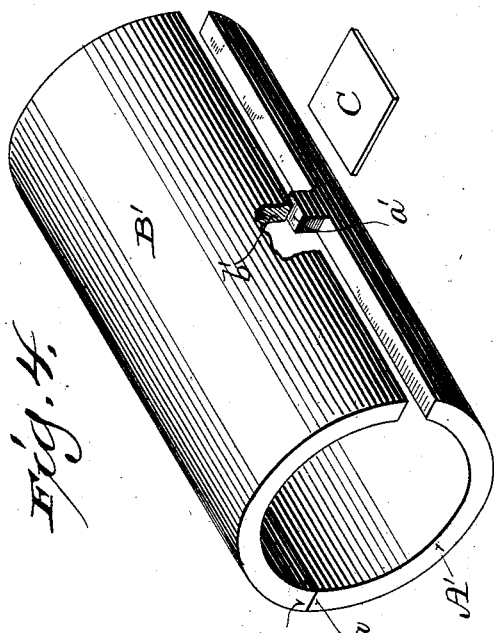
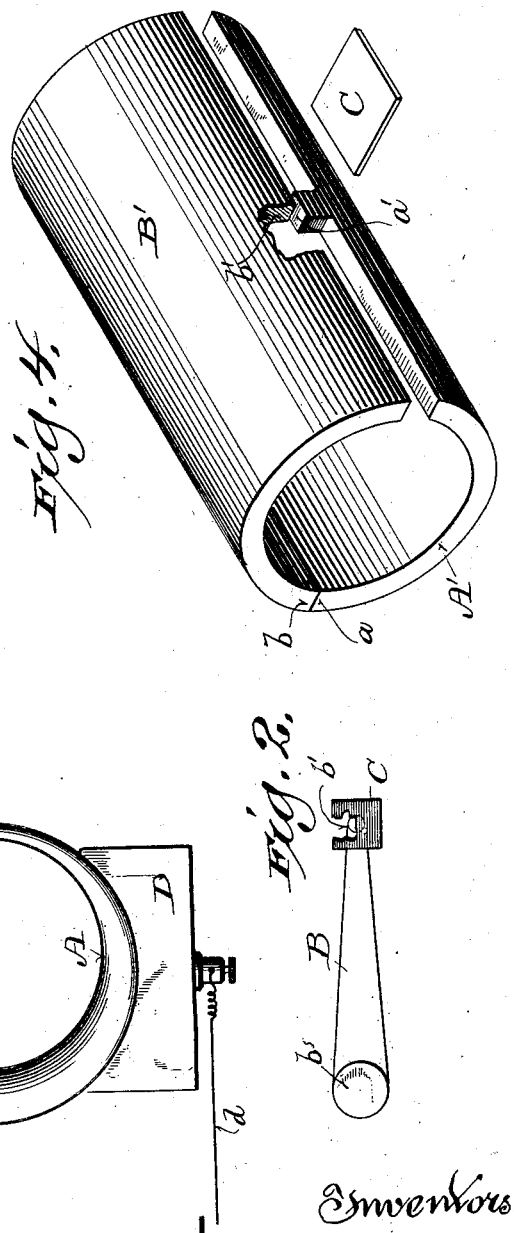
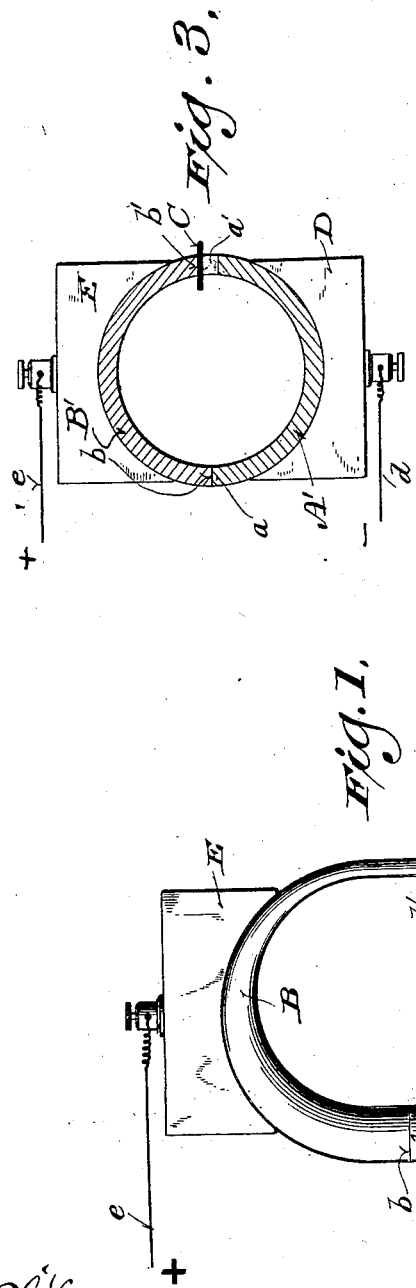
Witnesses:
Geo. W. Truny.
B. C. Roloff.
Inventors:
Joseph Schurek,
Franklin B. Giesler,
H. G. Underwood
Attorney No. 728,023. Patented May 12, 1903.

UNITED STATES PATENT OFFICE.

JOSEPH SCHUREK AND FRANKLIN B. GIESLER, OF MILWAUKEE, WISCONSIN.

METHOD OF ELECTRIC WELDING.

SPECIFICATION forming part of Letters Patent No. 728,023, dated May 12, 1903.

Application filed March 31, 1900. Renewed September 19, 1902. Serial No. 124,081. (No specimens.)

*To all whom it may concern:*

Be it known that we, JOSEPH SCHUREK and FRANKLIN B. GIESLER, citizens of the United States, and residents of Milwaukee, in the county of Milwaukee and State of Wisconsin, have invented certain new and useful Improvements in the Methods of Electric Welding; and we do hereby declare that the following is a full, clear, and exact description thereof.

Our invention has especial reference to the welding together of articles presenting different areas of surface at different welding-points; and it consists in a novel method of accomplishing this result, as will be fully set forth hereinafter with reference to the accompanying drawings and subsequently claimed.

In the said drawings, Figure 1 is a diagram illustrating the operation of our said invention. Fig. 2 is an end elevation of one of the parts of the article shown in Fig. 1 before welding, showing also a broken view of a non-conducting plate employed in said operation. Fig. 3 is a diagram similar to Fig. 1, but showing (in section) the two parts of another article to be similarly welded. Fig. 4 is a perspective and partly broken view of the article shown in Fig. 3 with a detached view of the non-conducting plate employed.

Referring to the drawings, A B represent the two parts of a steel link ready to be welded together, the side members of said link being of unequal size, the relative areas of the welding-points of said parts being best illustrated (with respect to the part B) at $b$ and $b'$ in Fig. 2, and the corresponding welding-points $a$ $a'$ of the part A being of precisely the same relative areas.

C represents a thin plate of any suitable non-conducting material, such as glass or gutta-percha.

D E indicate the electrodes, the same consisting in this instance of a pair of presser-blocks, which are preferably shaped on their opposed surfaces to conform to the shape of the adjacent portions of the parts of the article to be welded and which are arranged so that they may be simultaneously forced toward each other or separated, the specific construction of the machine of which these presser-blocks constitute a part forming, however, no part of this present invention, it being understood that said presser-blocks have the capability of movement just described and are properly connected, as by the wires $d\,e$, to a source of electric current, (not shown,) so as to form the electrodes or terminals of an electric circuit.

The foregoing description applies equally to the illustration of our invention in connection with the welding of the two parts of the slotted metallic cylinder shown in Figs. 3 and 4, wherein we have marked said two parts A' B', but otherwise employed the same reference-letters for the parts corresponding to those shown in Figs. 1 and 2.

In carrying our invention into practice, and referring now to Figs. 1 and 2, the two parts A and B of the link to be welded are supported between the electrodes or presser-blocks D E, with the described thin non-conducting plate C interposed between the welding-points $a'\,b'$ of least area of contact of the said two parts, and then the current is turned on, the said presser-blocks D E being forced toward each other and this pressure maintained until the said two parts A B of the link are welded together at the contacting points $a\,b$, and then the pressure of the blocks D E is momentarily released (without the necessity of shutting off the current) and the plate C withdrawn, when the pressure of the blocks D E is instantly restored to bring the welding-points $a'\,b'$ of the link into contact, when the current will immediately weld the parts thus brought into contact. Precisely the same operation would be carried out in welding together the two parts of the slotted metallic cylinder shown in Figs. 3 and 4, where the contacting surfaces $a\,b$ of the parts A' B' are to be understood as extending throughout the entire length of said parts, while the contacting surfaces marked $a'\,b'$ are relatively very short or of comparatively small area.

Without the use of an interposed body of non-conducting material at the welding-points $a'\,b'$ it would be impossible to successfully perform the operation of electric welding with an article presenting extreme differences in the areas of surface at different welding-points, for the reason that the electric current would burn or fuse away the metal at the welding-points of smaller areas before the welding could be accomplished between the contacting surfaces of greater areas; but by carrying out our present invention the welding of articles of this nature can be quickly and successfully accomplished.

Having thus described our invention, what we claim as new, and desire to secure by Letters Patent, is—

1. The method of welding together pieces of metal which present different areas of surface at different welding-points, consisting in bringing and holding said pieces together between a pair of electrodes, and with the larger welding-points in contact and the smaller welding-points kept out of contact; sending an electric current through said pieces of metal until they are welded together at said larger welding-points, and then bringing the smaller welding-points of said pieces of metal into contact and holding them together until the said pieces of metal are welded together at said smaller welding-points.

2. The method of welding together pieces of metal which present different areas of surface at different welding-points, consisting in inserting a body of non-conducting material between the smaller welding-points and then holding the said pieces of metal together, under pressure, between a pair of electrodes and with the larger welding-points in contact; maintaining the pressure and sending an electric current through said pieces of metal until they are welded together at said larger welding-points; momentarily releasing the pressure, and withdrawing said non-conducting body from between the said smaller welding-points and then immediately restoring the pressure, so as to bring said smaller welding-points into contact, and maintaining the pressure until said pieces of metal are also welded together at said smaller welding-points by the current passing therethrough.

In testimony that we claim the foregoing we have hereunto set our hands, at Milwaukee, in the county of Milwaukee and State of Wisconsin, in the presence of two witnesses.

JOSEPH SCHUREK.
FRANKLIN B. GIESLER.

Witnesses:
H. G. UNDERWOOD,
B. C. ROLOFF.